United States Patent [19]

Kokubu et al.

[11] Patent Number: 4,753,599
[45] Date of Patent: Jun. 28, 1988

[54] AUTOMOTIVE STEERING ASSEMBLY

[75] Inventors: Sadao Kokubu, Kani; Yasuo Miyake, Ichinomiya; Shinji Mizutani, Hachikaimura, all of Japan

[73] Assignee: Kabushiki Kaisha Tokai Rika Denki Seisakusho, Aichi, Japan

[21] Appl. No.: 30,525

[22] Filed: Mar. 27, 1987

[30] Foreign Application Priority Data

Mar. 31, 1986 [JP] Japan ............................... 61-46104[U]
Aug. 11, 1986 [JP] Japan ............................. 61-122182[U]
Aug. 11, 1986 [JP] Japan ............................. 61-122183[U]

[51] Int. Cl.$^4$ .......................... B62D 1/10; B62D 1/16
[52] U.S. Cl. .................................. 439/15; 74/484 R; 74/492; 74/552; 200/61.54
[58] Field of Search ...................... 74/484 R, 492, 552; 200/61.54; 439/15

[56] References Cited

U.S. PATENT DOCUMENTS

| | | | |
|---|---|---|---|
| 4,586,397 | 5/1986 | Kokubu | 200/61.54 X |
| 4,603,599 | 8/1986 | Matsudka | 200/61.54 X |
| 4,633,731 | 1/1987 | Kurata | 74/484 R X |

FOREIGN PATENT DOCUMENTS

| | | | |
|---|---|---|---|
| 57-95232 | 6/1982 | Japan | 200/61.54 |
| 60-92652 | 6/1985 | Japan | |

Primary Examiner—Allan D. Herrmann
Attorney, Agent, or Firm—Murray and Whisenhunt

[57] ABSTRACT

An automotive steering assembly which has a steering pad maintained stationary independently of the steering wheel operation is disclosed. The assembly employs a sun and planetary gear system in transmission of rotary motion to the steering shaft. The steering wheel is rigidly attached to the steering shaft while the sun and planetary gear system contributes to maintenance of the orientation of the steering pad. In the sun and planetary gear system, the role of the sun portion is played by a timing belt whereas that of the planetary portion is played by a rotary gear wheel. The above timing belt and planetary gear wheel are adapted to be disengaged from each other upon entry of foreign matters including sand grains or the like.

12 Claims, 13 Drawing Sheets

AUTOMOTIVE STEERING ASSEMBLY

BACKGROUND OF THE INVENTION

This invention relates to an automotive steering assembly in which a steering pad disposed at a central portion of the steering wheel is held stationary independently of the rotation of the steering wheel.

Recently, an attempt has been made to arrange various kinds of push buttons or the like on a steering pad so that various operations can be performed by them. These push buttons are made to stay stationary even when the steering wheel is turned.

Such steering wheel assembly is composed by supporting the steering pad on a mechanism including a ring-shaped stationary member fixed to the car body and provided around the steering shaft to rotatably support the same, another ring-shaped member provided rotatably around the steering shaft to carry the steering pad thereon, a timing belt passing around said two ring-shaped members in meshing engagement and a rotary member also provided in meshing engagement with said timing belt and rotatably connected to the steering wheel. In this structure, said timing belt passes around the two ring-shaped members and the rotary member. Upon operation of the steering member, the two ring-shaped members are maintained stationary whereas the rotary member rotates around the two ring-shaped members while rotating on the timing belt.

If, however, any foreign matters including said grains or the like enters between the timing belt and the rotary member, the teeth of the above engaging members tend to be worn or broken so that their replacement is often required. Moreover, it is often observed that the entry of such foreign matters gives the steering wheel a slightly heavy feel to the driver.

SUMMARY OF THE INVENTION

The present invention was accomplished in order to eliminate the above-mentioned shortcomings of the steering assembly. The means is accomplished by the provision of a steering assembly including a steering shaft rotating together with a steering wheel, a gear means provided on a stationary member disposed coaxially with the steering shaft, gear means provided on a pad member disposed at an upper part of the steering wheel, a timing belt mashing at its upper and lower sides with the gear means on the stationary member and the gear means on the pad member, and a third gear means meshing with the timing belt. Said timing belt and said third gear means are adapted to disengage from each other.

In this steering assembly, the gear means on a pad member is meshed with a timing belt which is meshed with a stationary member and held stationary, so that the pad member is not rotated.

And, the rolling movement of a third gear means on the timing belt when the steering wheel is rotated causes the steering wheel and steering shaft to be rotated integrally. However, when the third gear means becomes so hard to rotate on the timing belt that it is not so easy to rotate the steering wheel, the meshing engagement between the third gear means and the timing belt is canceled through deformation of associated elements under the forced rotation of the steering wheel, so that the steering wheel becomes able to rotate.

DETAILED DESCRIPTION OF THE EMBODIMENTS

Figure 2:
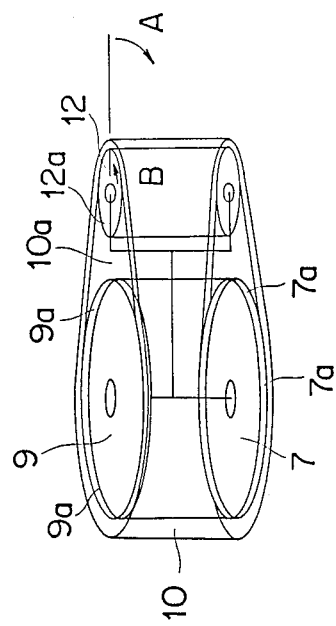
FIG. 2 is a schematic illustration showing the operation of the embodiment of FIG. 1.

One embodiment of the present invention will be described hereunder with reference to FIGS. 1 and 2.

Within a column cover 1 of the steering assembly, a pipe 2 is fixed to the car body on a forward side to extend toward a rearward side. Within the pipe 2, a steering shaft 4 is rotatably supported through a bearing 3 on the forward side. The steering shaft 4 is fixedly attached with a boss portion 5a of the steering wheel 5 by a nut 6 on the rearward side. The pipe 2 is fixedly attached at one end with a ring-shaped stationary member 7. Also, the steeriing shaft 4 is rotatably provided at its top end portion with a ring-shaped member 9 to be held stationary. Said ring-shaped member 9 has the same diameter as that of the stationary member 7 and is disposed in opposite relation with the stationary member 7 by means of a bearing 8. Engaging portions 7a, 9a having narrow grooves are formed in outer peripheral surfaces of the stationary member 7 and the member 9 to be held stationary respectively. A timing belt 10 of an elastic material is engaged at its upper and lower end portions with the engaging portions 7a, 9a.

On the other hand, a supporting shaft 11 is disposed on the under-surface of the steering wheel 5 in parallel relation with the steering shaft 4. A rotary member 12 is mounted on the supporting shaft 11. An engaging portion 12a having narrow grooves formed in the outer peripheral surface of the rotary member 12 is engaged with an internal engaging surface 10a of the timing belt 10.

A steering pad 13 is fixed to the upper surface of the member 9 to be held stationary because it has been required that an operation portion for controlling the electronic equipment such as switches or the like is arranged on the steering pad 13.

Figure 1:
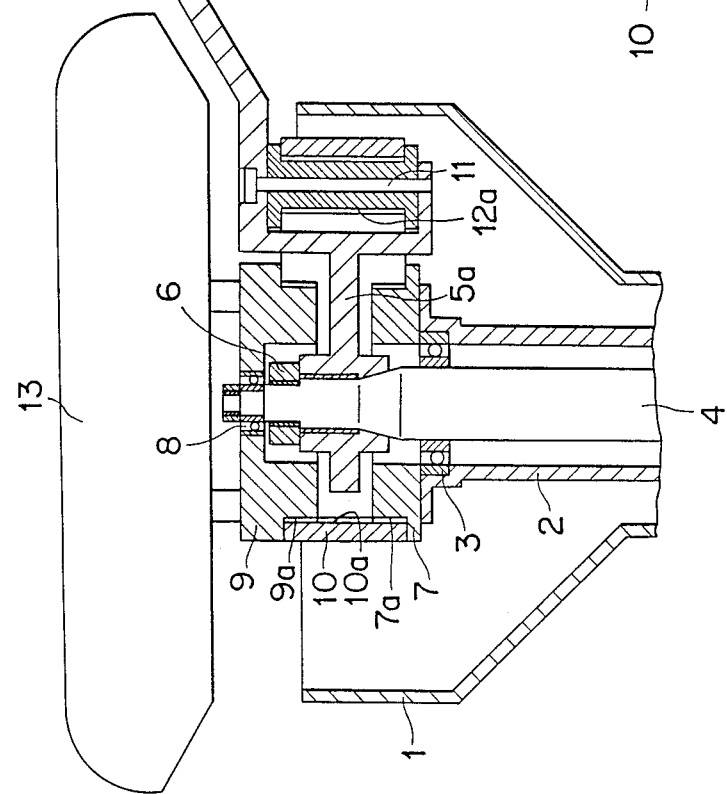
FIG. 1 is a cross section of an automotive steering assembly of one embodiment of the present invention.
Figure 3:
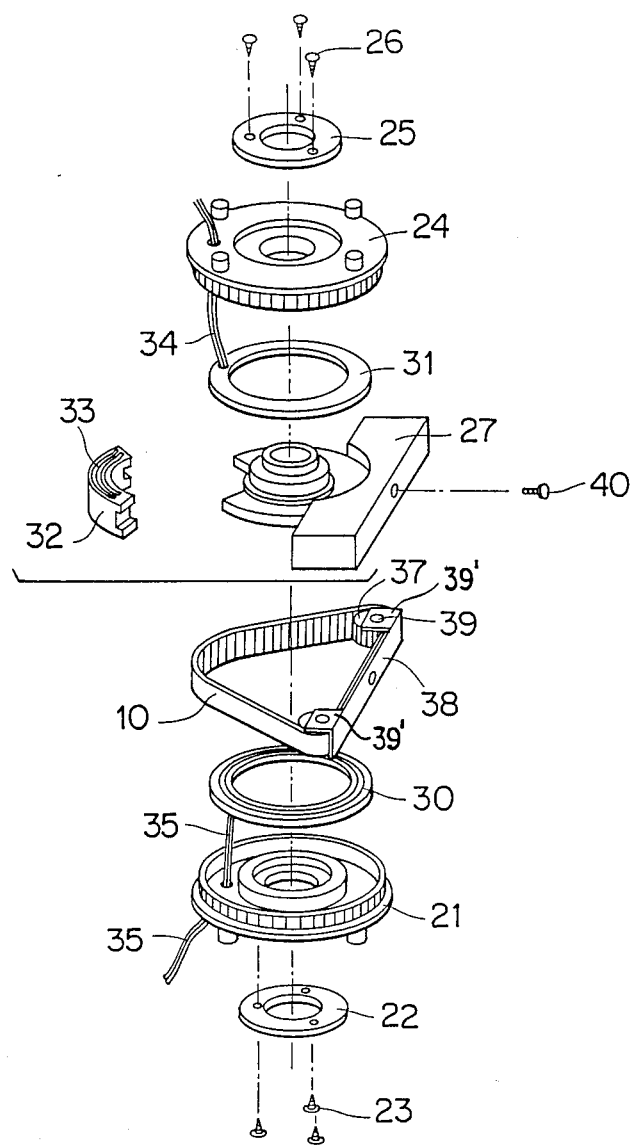
FIG. 3 is an exploded perspective view of another embodiment of the present invention.
Figure 4:
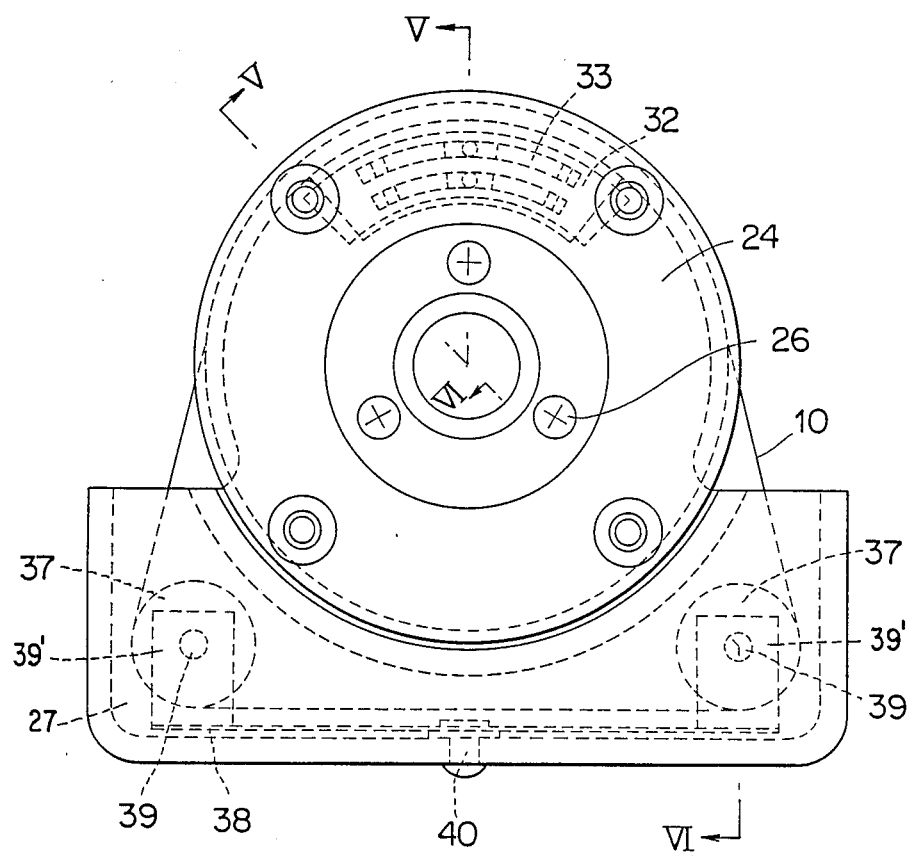
FIG. 4 is a plan view of the above embodiment in which all the parts are assembled.
Figure 5:
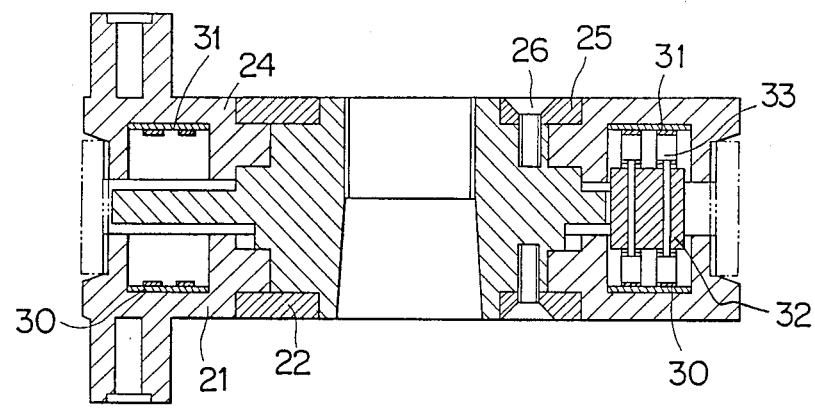
FIG. 5 is a sectional view taken along line V—V of FIG. 4.
Figure 6:
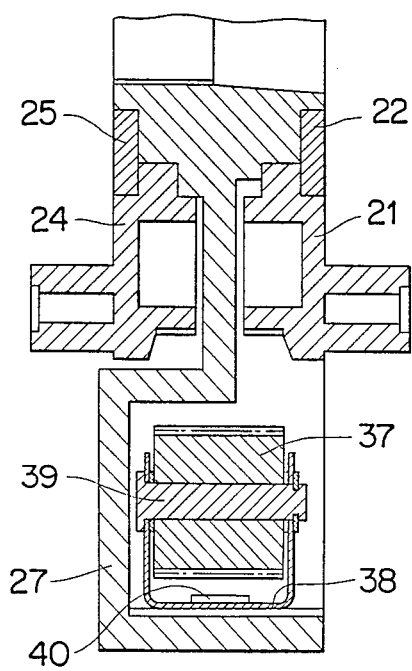
FIG. 6 is a sectional view taken along line VI—VI of FIG. 4.

FIG. 2 is an illustration for showing a principle of associated movements among the stationary member 7, member 9 to be held stationary, timing belt 10, and rotary member 12 of FIG. 1. When the steering wheel 5 is rotated together with the steering shaft 4 thereabout, the rotary member 12 mounted on the supporting shaft 11 is also moved about the steering shaft 4 in the direction shown by an arrow A. At this time, since the stationary member 7 is fixed to the main body of an automobile by the pipe 2, the rotary member 12 rolls on the timing belt 10 in the direction as shown by an arrow B. On the other hand, since the member 9 to held stationary is connected to the steering shaft 4 through bearing 8, it is free from the rotation of the steering shaft 4. Since the member 9 to be held stationary is engaged with the timing belt 10, it is integrated with the stationary member 7 and not rotated. Accordingly, even when the steering wheel 5 and steering shaft 4 are rotated, the steering pad 13 is always held stationary in a predetermined position.

In the above-described steering assembly, when the rotary member 12 is prevented from being rotated by dust or the like thereby to render the rotary member 12 difficult to roll on the timing belt 10, the elastic timing belt expands to such an extent that the timing belt 10 and the rotary member 12 disengages from each other to permit a further rotation of the rotary member 12 on the timing belt 10.

Another embodiment of the present invention will be described with reference to FIGS. 3 through 7.

21 denotes a first gear wheel secured to a stopper plate 22 provided on a stationary member such as a steering column or the like by a screw 23. 24 denotes a second gear wheel secured to a stopper plate 25 provided on a member to be held stationary such as a steering pad or the like by a screw 26.

Figure 7:
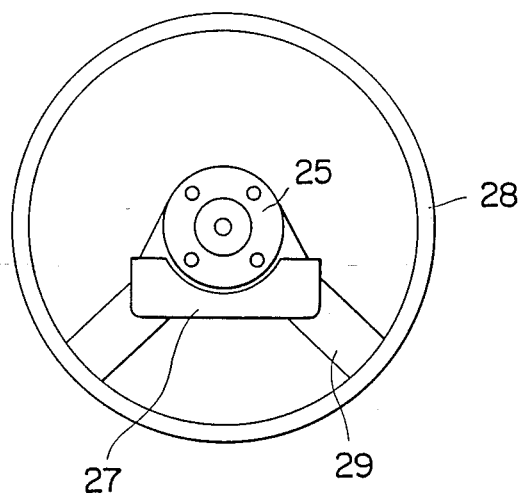
FIG. 7 is a plan view showing the mounting state of the steering wheel.

As is shown in FIG. 7, a spoke 29 of a steering wheel 28 is mounted to a mounting member 27 fixed to a steering shaft (not shown), and the steering wheel 28 and mounting members 27 are moved together upon rotation of the steering wheel 28 to cause the vehicle to change its direction.

The gear wheels 21, 24 are fixed with slip rings 30, 31 on which a plurality of conductive rings are formed respectively. The gear wheels 21, 24 are rotatably mounted on the steering shaft by contacting the conductive rings with arc-shaped contacts 33 of a contact holder 32 mounted on the mounting member 27.

The conductive rings on the slip rings 31 are connected with a lead wire 34 from an operation piece such as a push button or the like provided on the steering pad, whereas the conductive rings on the slip ring 30 are connected with a lead wire 35 to various apparatuses which are operated by the operating piece.

The first and second gear wheels 21, 24 are meshed with the lower and upper sides of the timing belt 10 having an inner engaging surface formed with a plurality of grooves. Since the gear wheel 21 is unable to rotate, the gear wheel 24 is also unable to rotate.

The timing belt 10 is meshed with a pair of third planetary gear wheels 37. The pair of third gear wheels 37, 37 rotatably mounted on a plate spring 38 by a pin 39 extending through brackets 39'.

In this way, the steering pad is always held stationary independently of the rotation of the steering wheel 28.

And, when the steering wheel 28 is rotated, the mounting member 27 is rotated by rolling the pair of third gear wheels 37, 37 on the timing belt 10. Accordingly, the steering shaft and steering wheel are integrally rotated.

At this time, since the contacts 33 on the contact holder 32 slides on the conductive rings of the slip rings 30, 31, the operation piece on the steering pad and the electrical equipment to be operated are held in contact engagement and the operation command to the electrical equipment to be operated by the operation piece is always held in the state ready to transmit.

Since the timing belt 10 is stretched in the direction energized by the leaf spring 38, the play is difficult to occur an the steering pad is prevented from being tilted.

However, when the pair of third gear wheels 37, 37 become hard to rotate and thereby hard to roll on the timing belt 10, and, as a result, it is not easy to rotate the steering wheel 28, the forceful rotation of the steering shaft 28 causes the leaf spring 38 to bend against the resilience of the leaf spring 38. As a result, the tension of the timing belt 10 is lost and the third gear wheel 38 is slipped on the timing belt 36.

In this way, the slipping movement of the gears 37, 37 on the timing bolt 10 permits the steering wheel 28 to rotate.

Next, a further embodiment of the present invention will be described hereunder with reference to FIGS. 8 through 11, in which like members are designated by like reference numerals.

21 denotes a gear wheel which is sandwiched between a boss 5a and a stopper plate 22 secured to the boss 5a by a screw 23. The gear wheel 21 is provided with an anti-rotation pin 21b. This pin 21b is engaged with a column side stationary member 14 (see FIG. 11). 24 denotes a gear wheel which is sandwiched between a boss 5a and a stopper plate 25 secured to the boss 5a by screw 26. The gear wheel 24 is provided with a pad mounting projection 24b by which the gear wheel 24 and a pad 13 are retained. The boss 5a is rotatably slide contacted against the gear wheels 21 and 24.

15 denotes a mounting plate for axially supporting a steering shaft 4. 41 denotes a spoke of a steering wheel 5 fixed to the steering shaft 4. When the steering wheel is rotated, the steering shaft is rotated to change the running direction of the vehicle.

The gear wheels 21 and 24 are meshed with an upper and a lower side of a timing belt 10. Since the gear wheel 21 is unable to rotate, the gear wheel 24 is also unable to rotate.

This timing belt 10 is meshed with two third gear wheels 37 which are axially supported on both left and right sides of a leaf spring 38 by a shaft 39. This leaf spring 38 is secured to a mounting member 27 by a screw 26'.

Accordingly, the steering pad 13 is always held in its stationary state independently of the rotation of the steering wheel.

And, when the steering wheel is rotated, the mounting member 27 rotates with the steering wheel, the third gear wheels 37 are caused to roll on the timing belt 10. Accordingly, the steering shaft 4 is rotated together with the steering wheel.

At this time, since the timing belt 10 is energized in the direction stretched by the resilience of the leaf spring 38, no play is found between the gears 21 and 24, thereby to prevent the steering pad 13 from swinging.

When the steering wheel is forcefully rotated, the leaf spring 38 is apt to be warped against its resilience. Due to the foregoing, the tension of the timing belt 10 is lessened and the third gear wheels 37 slip on the timing belt 10. In this way, the steering wheel becomes able to rotate.

Figure 8:
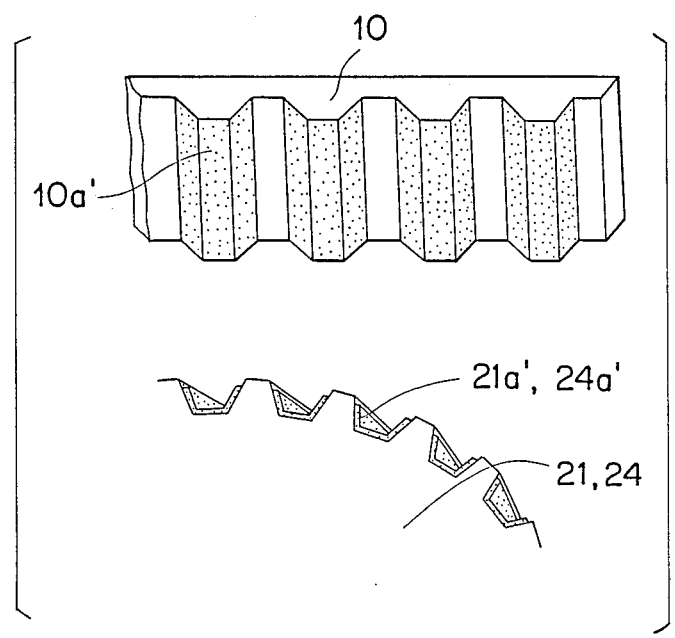
FIG. 8 is an enlarged view of a gear wheel and the timing belt in a further embodiment of the invention.

Such timing belt 10 as mentioned is applied with a metal plating 10a' at the ridge portion of its gear all the way from its upper edge to its lower edges as shown by hatching in FIG. 8.

On the other hand, the gears 21, 24 are also applied with metal platings 21a', 24a' at portions shown by the hatching of FIG. 8 respectively. Therefore, the conductive areas in the form of the metal plating 10a and the metal platings 21a', 24a' are contacted each other thereby to create a conductive state from the metal plating 21a' to the metal plating 24a'.

The metal plating 21a' on the gear wheel 21 is connected to load-side terminals 21b provided on its undersurface and said load-side terminals 21b is connected to various actuation circuits of the vehicle by lead wires respectively.

On the other hand, the metal plating 24a' on the gear wheel 24 is connected to pad-side terminals 24b provided on its upper surface and said pad-side terminals 24b is connected to the operation members such as a push button on the steering pad 13 by lead wires.

Accordingly, the on/off signals produced by means of the operation members on the steering pad 13 are transmitted to the actuation circuit via the terminals 24b, metal plating 24a', metal plating 10a', metal plating 21a' and terminal portion 1a so that a required action is performed.

Contrary to the above embodiment, even if the metal platings 21a', 24a' are applied to the ridge portions of the teeth of the gear wheels 21, 24, and the metal plating 10a' to the root portion of the teeth of the timing belt 10, or otherwise the entire ridge portion is formed of a conductive rubber material instead of the metal plate applied to the ridge portion of the timing belt 10, the same function can be obtained as that of the above-mentioned embodiment.

Furthermore, if a plurality of the teeth meshed are connected to the same circuit, reliability of the signal transmission can be increased.

Figure 9:
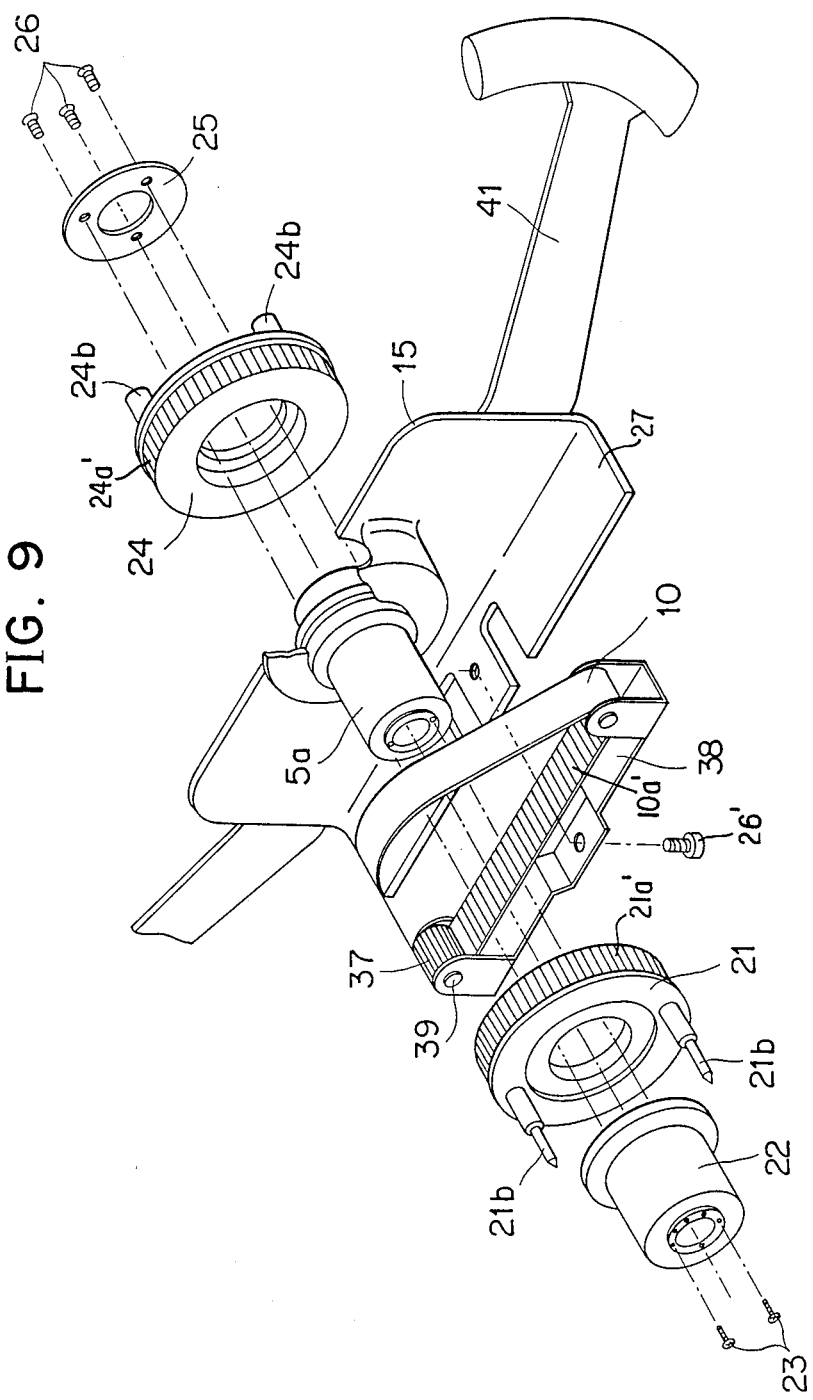
FIG. 9 is an exploded perspective view of an entire steering assembly.
Figure 10:
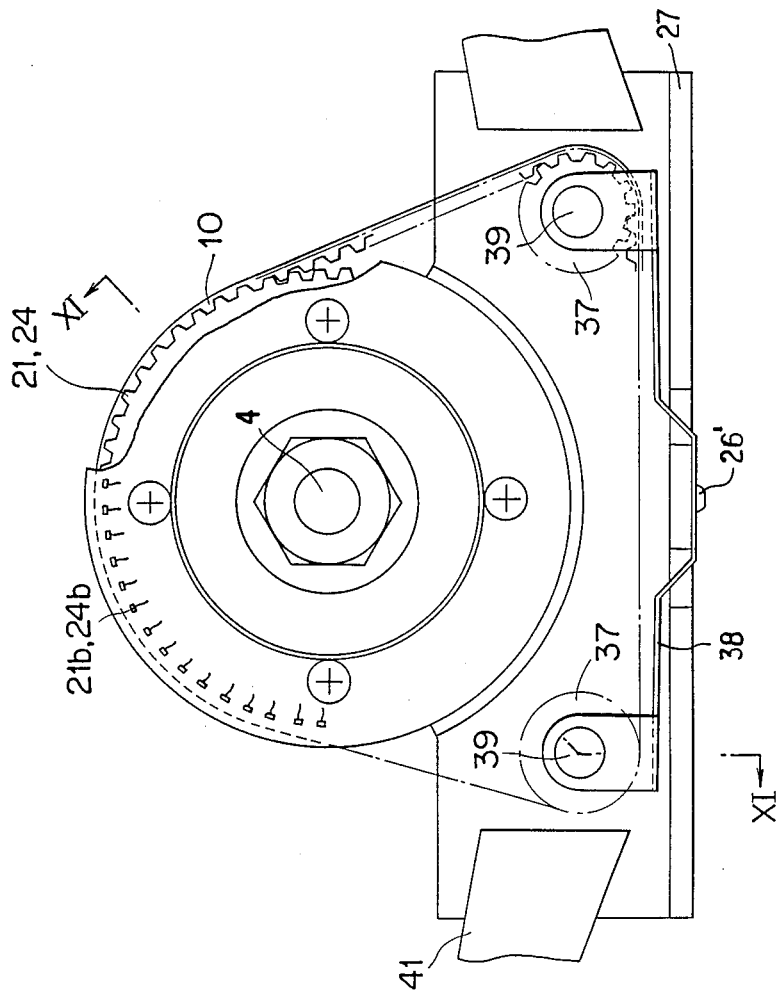
FIG. 10 is a plan view of the same when assembled.
Figure 11:
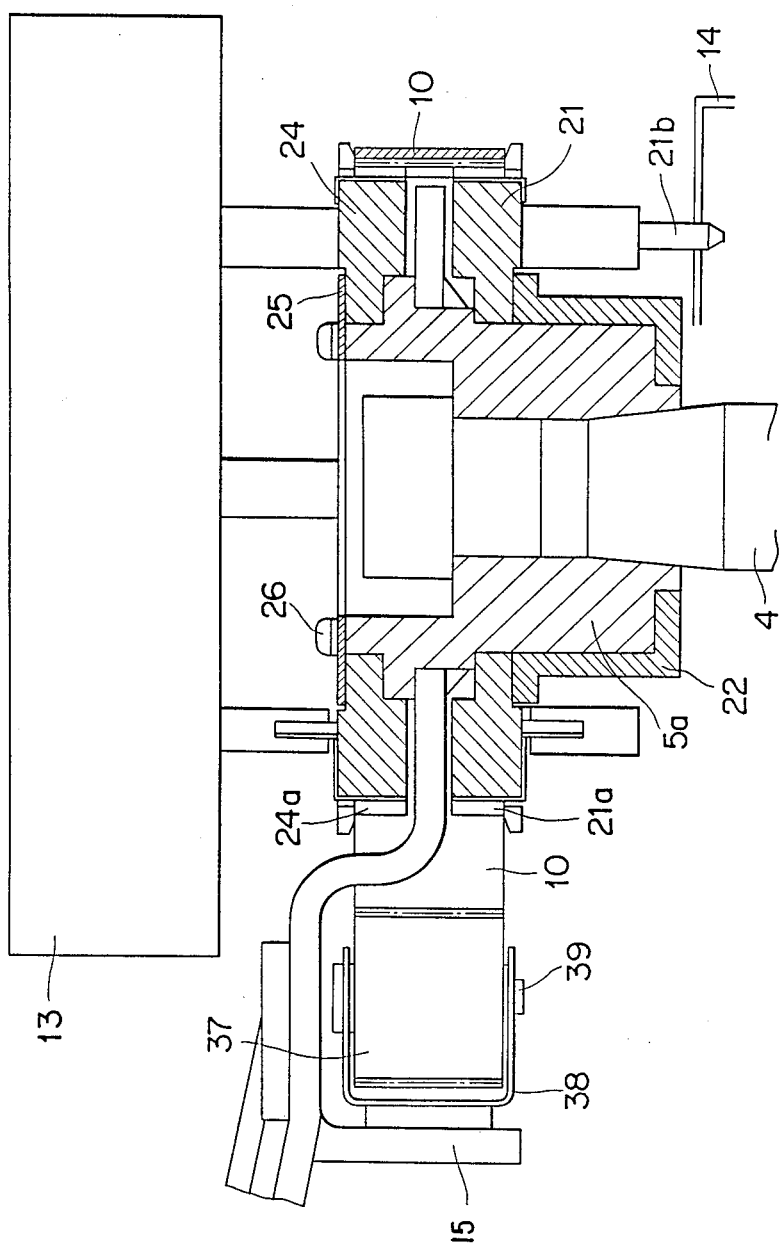
FIG. 11 is a sectional view taken along line XI—XI of FIG. 10.
Figure 12:
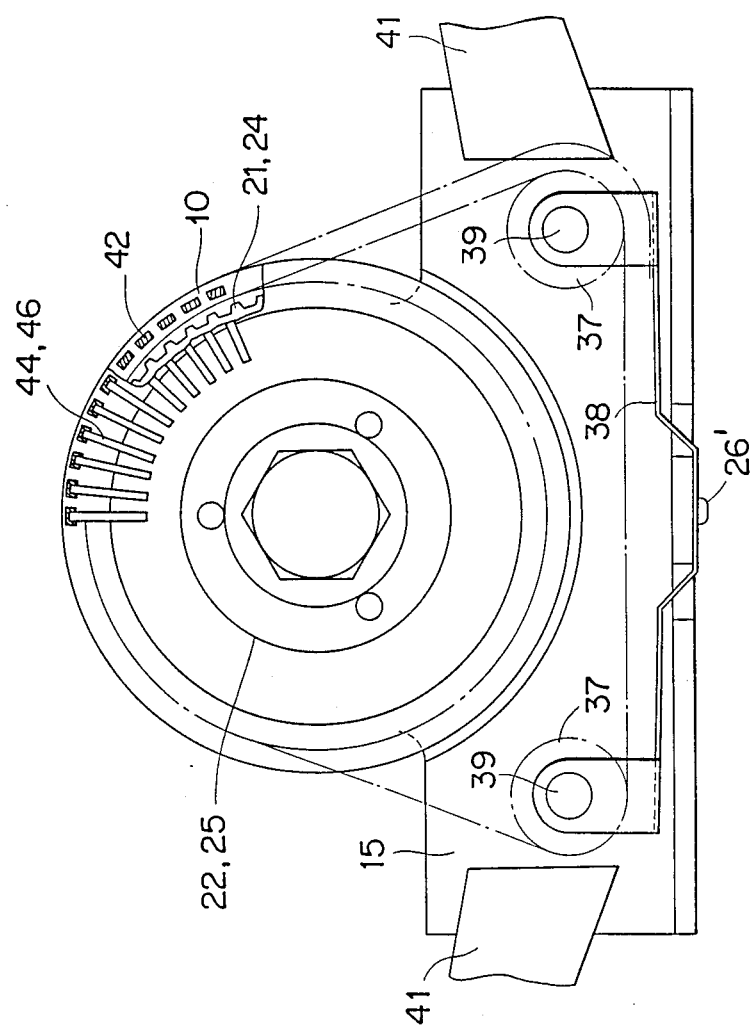
FIG. 12 is a plan view of a still further embodiment of the present invention.
Figure 13:
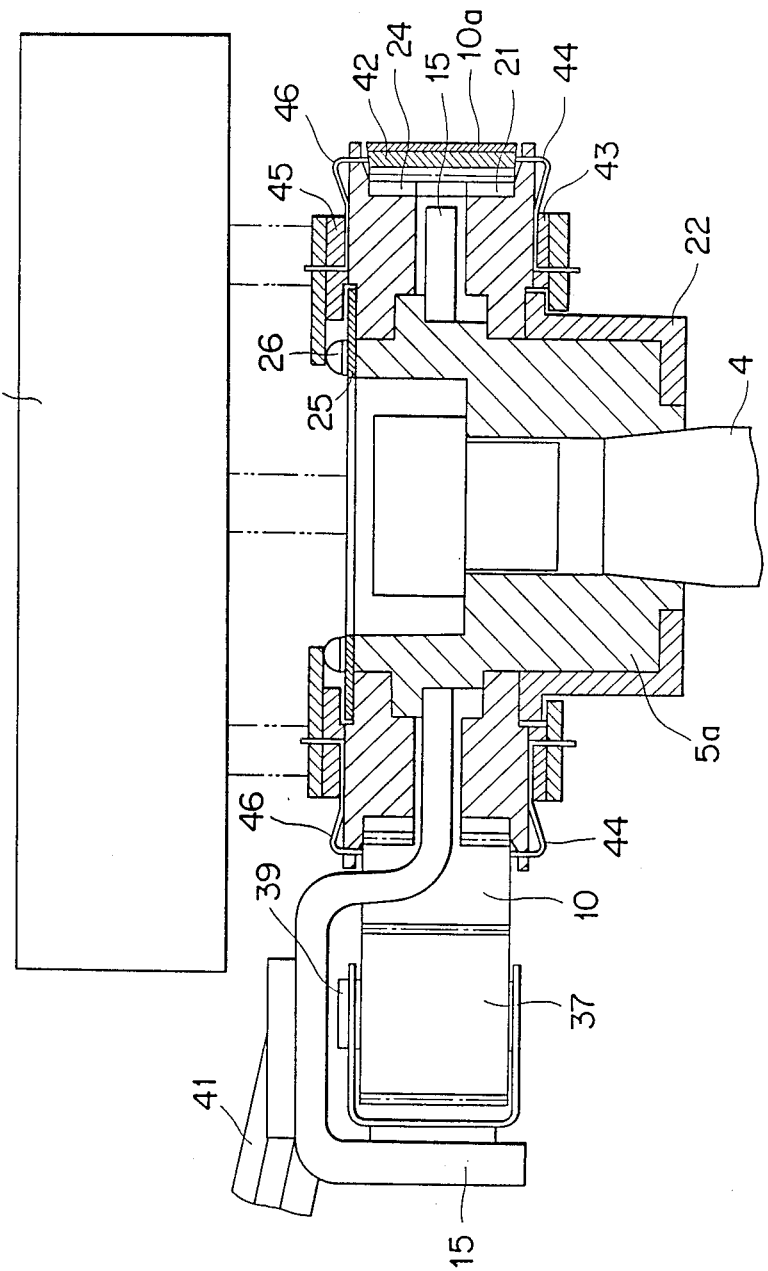
FIG. 13 is a vertical sectional view of the FIG. 12.

A still further embodiment of the present invention will be described with reference to FIG. 9 and FIGS. 12 through 13.

21, again, denotes a gear wheel which is sandwiched between a boss 5a and a stopper plate 22 secured to the boss 5a by a screw 23. The gear wheel 21 is provided with an anti-rotation pin 21b. This pin 21b is engaged with a column side stationary member 14. 24 denotes a gear wheel which is sandwiched between a boss 5a and a stopper plate 25 secured to the boss 5a by a screw 26. The gear wheel 24 is provided with a pad mounting projection 24b by which the gear wheel 24 and a pad 13 are retained. The boss 5a is rotatably slide contacted the gear wheels 21 and 24.

15 denotes a mounting plate for axially supporting a steering shaft 4. 9 denotes a spoke of a steering wheel fixed to the steering shaft 4. When the steering wheel is rotated, the steering shaft is rotated to change the running direction of the vehicle.

The gear wheels 21 and 24 and meshed with an upper and a lower sides of a timing belt 10. Since the gear 21 is unable to rotate, the gear wheel 24 does not rotate. This timing bolt 10 is meshed with two third gear wheels 37 which are axially supported on both left and right sides of a leaf spring 38 by a shaft 39. This leaf spring 38 is secured to a mounting member 27 by a screw 26'.

Accordingly, the steering pad 13 is always held in its stationary state independently of the rotation of the steering wheel.

When the steering wheel is rotated, the mounting member 27 rotates with the steering wheel, and the third gear wheels 37 are caused to roll on the timing belt 10. Rotation of the steering wheel causes rotation of the steering shaft 4.

A conductive member 42, which is exposed at both upper and lower end faces of the timing belt 10, is buried in the timing belt behind the respective ridges of the gear thereof.

On the other hand, terminals 44 are radially mounted on the gear wheel 21 at every ridge of the teeth thereof through a spacer 43.

Similarly, terminals 46 are also radially mounted on the gear wheel 24 at every ridge of the teeth thereof through a spacer 45. These terminals 44, 46 are able to contact the timing bolt 10 and conductive member 42 at both upper and lower edges of the timing belt 10.

Accordingly, the terminals 44, 46 are brought to be in the conductive states by the conductive member 42. The signal from the operation member on the steering pad 13 connected with the terminal 46 is transmitted in the same manner as the various actions connected to the terminal 44 to actuate this.

Figure 14:
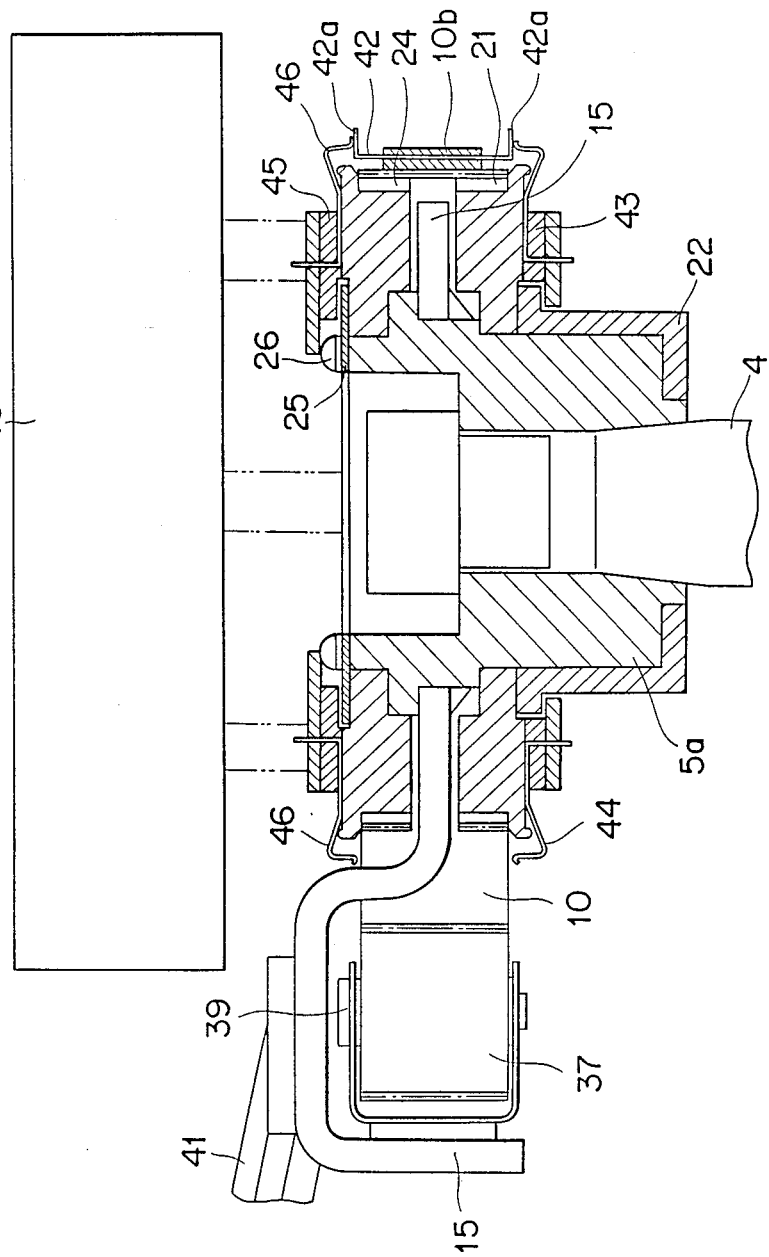
FIG. 14 is a still further embodiment of the present invention in vertical cross section.

Next, a still further embodiment of the present invention will be described with reference to FIG. 14.

In this embodiment, a timing belt 10 is formed with a raised portion 10b on its outer surface. A conductive member 42 with its both upper and lower edge portions served as a bent portion 42a is buried in this raised portion every ridge or root of the gear of the timing belt 10.

And, the gear wheels 21, 24 are provided with terminals 44, 46 in the same manner as the preceding embodiment and the front edges thereof are formed with bent portions 44a, 46a which are contacted to the bent portion 42a of the conductive member 42. The function thereof is the same as the preceding embodiment.

Figure 15:
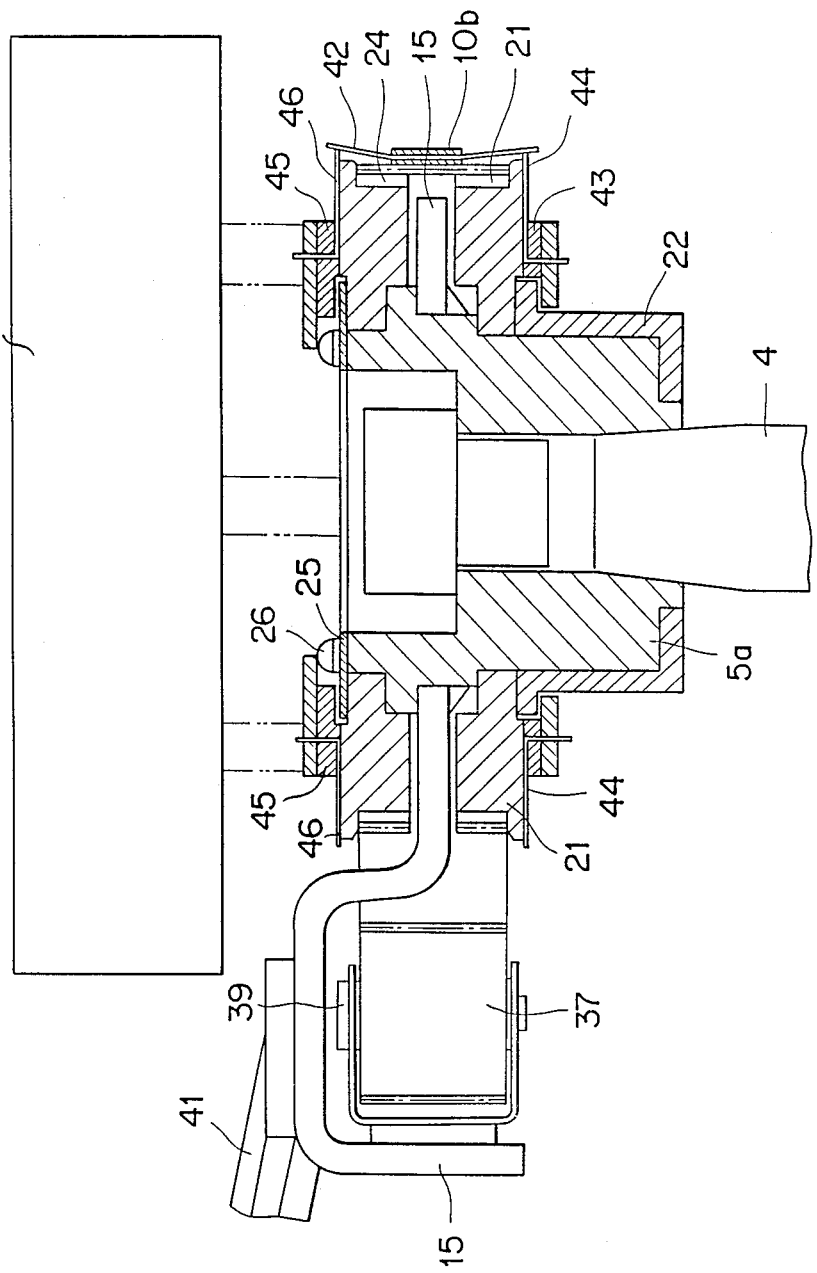
FIG. 15 is a still further embodiment of the present invention in vertical cross section.

FIG. 15 illustrates a still further embodiment of the present invention. As same in the case of the preceding embodiment, a raised portion 10b of a timing belt 10 is buried with a conductive member 42 every pitch of the gear excepting that the front edge thereof is not formed with a folding portion 42a.

And, gear wheels 21, 24 are provided with terminals 44, 46 as same in the case of the preceding embodiment. Since the front edges thereof are contacted with the internal engaging surface of a conductive member 46, the action in this embodiment is as same in the case of the preceding second embodiment.

Figure 16:
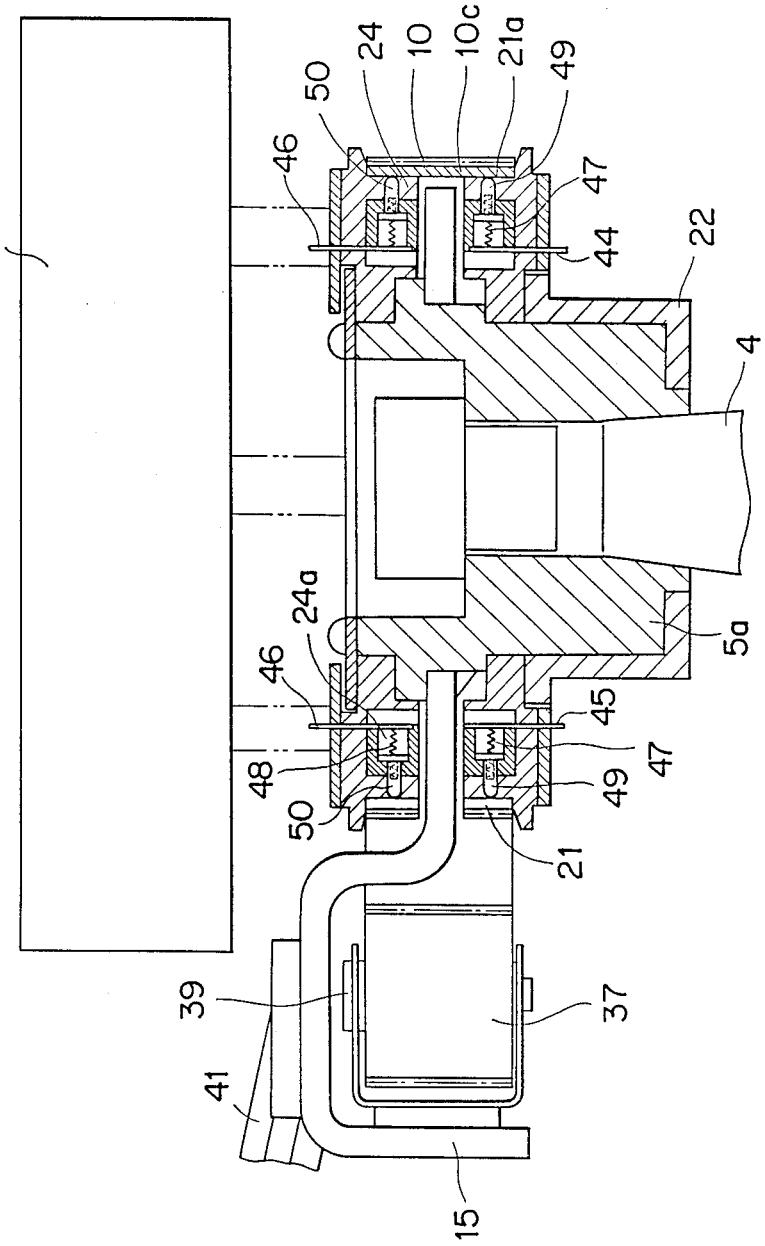
FIG. 16 is a still further embodiment of the present invention in vertical cross section.

In the fourth embodiment of FIG. 16, the ridge portion of a timing belt 10 is formed of a conductive rubber material 10c.

Gear wheels 21, 24 are formed with a plurality of chambers 21a, 24a behind the respective root portions of the teeth and springs 47, 48 and terminals 49, 50 are stored therein so that the contacts 49, 50 are contacted with the rubber material 10c of the timing belts 10.

Communication holes are formed between the respective root portions of the engaging surfaces and the respective chambers 21a and 24a and, in the respective communication chambers 21a and 24a, there are inserted a plurality of contacts to contact the respective conductive rubber material 10c. Further, metal springs 47, 48 are accommodated in the corresponding chambers 21a, 24a in contact with the respective contacts 49, 50 while the contacts 49, 50 are in contact with the rubber material 10c of the timing belt 10. Since the load-side terminals 44 and the pad-side terminals 46 extend into the respective chambers inside the metal springs 47, 48 in radial directions to contact the same. Therefore, from the terminals 44 contacting the spring 47, the terminals 46 contacting the contact 49, rubber material 10c, contact 50 and spring 48 becomes conductive, thereby enabling to transmit the signal in the same manner as the above-mentioned embodiments.

As apparent from the foregoing description, the steering pad is not rotated even when the steering wheel is rotated. When an operation piece such as a push button or the like is provided thereon, the steering pad is always held in its normal state. Accordingly, the operation piece is easy to operate.

And, since the timing belt with which the gear wheel on the stationary member and the gear wheel on the pad member in meshing engagement is always urged in the stretching direction by the urging member, no play will be produced in the meshing engagement between them. Accordingly, the steering pad is not undesirably swung and the operation piece is not difficult to operate.

Moreover, when the engaging portions of the gear wheels or the timing belt will not be worn or broken even if any foreign matters including sand grains or the like enter between the engaging portions.

It should also be noticed that the steering wheel operation can be performed smoothly.

What is claimed is:

1. An automotive steering assembly, comprising:
   a steering shaft rotatably supported with respect to a vehicle body on a forward side thereof and extending toward a rearward side thereof;
   a steering wheel rigidly mounted to said steering shaft on said rearward side;
   first gear means provided rigidly with respect to said vehicle body and coaxially around said steering shaft;
   second gear means rigidly mounted on a pad member which is rotatably carried on top of said steering wheel, said second gear means being coaxial with said first gear means;
   a timing belt having a plurality of grooves in an inner engaging surface thereof and passing around said first and second gear means for meshing engagement;
   third gear means mounted on said steering wheel and maintained in meshing engagement with said timing belt;
   said timing belt and said third gear means being disengageable from each other;
   mounting means rigidly attached to said steering shaft and extending radially outwardly; and
   urging means attached to said third gear means and said mounting means for providing tension on said timing belt.

2. An automotive steering assembly according to claim 1, wherein said third gear means includes a pair of planetary gear wheels and said urging means includes a leaf spring having opposite ends thereof pivotally supporting said pair of planetary gear wheels.

3. An automotive steering assembly according to claim 2, wherein said mounting means includes a mounting member which supports the leaf spring radially outwardly thereof.

4. An automotive steering assembly according to claim 1, wherein said first gear means had load-side terminals and said second gear means has pad-side terminals, said automotive steering system further including connecting means for connecting said load-side terminals and pad-side terminals.

5. An automotive steering assembly according to claim 4, wherein said connecting means includes a pair of slip rings rigidly attached to said respective first and second gear means and having opposing surfaces formed with a plurality of conductive rings and a contact holder attached to said mounting means and carrying a plurality of arc-shaped contacts thereon for electrical contact with said conductive rings of said slip rings.

6. An automotive steering assembly according to claim 4, wherein said connecting means includes a plurality of conductive areas formed on said respective first and second gear means and extending axially with spacings therebetween and connected to said load-side and pad-side terminals; and a plurality of conductive areas formed on an inner periphery of the timing belt and extending axially with spacings therebetween for contacting said plurality of conductive areas of the first and second gear means.

7. An automotive steering assembly according to claim 6, wherein said conductive areas of the first and second gear means are formed on ridge portions thereof and said conductive areas of the timing belt are formed on root portions in the engaging surfaces thereof.

8. An automotive steering assembly according to claim 4, wherein said connecting means includes a plurality of conductive members buried in the timing belt behind ridge portions thereof and extending axially to be exposed at axial end surfaces of the timing belt, said load-side and pad-side terminals of the respective first and second gear means being radially arranged to contact said plurality of conductive members.

9. An automotive steering assembly according to claim 4, wherein said connecting means includes a plurality of raised portions radially formed on an outer periphery of the timing belt and extending axially; and a plurality of conductive members buried in said raised portions and extending radially to be exposed at axial opposite end surfaces, said load-side and pad-side terminals of the respective first and second gear means being radially arranged to contact said plurality of conductive members.

10. An automotive steering assembly according to claim 9, wherein said plurality of conductive members and said load-side and pad-side terminals are bent at their respective end portions.

11. An automotive steering assembly according to claim 9, wherein said plurality of conductive members and said load-side and pad-side terminals are straight at their respective end portions.

12. An automotive steering assembly according to claim 9, wherein said connecting means includes conductive rubber portions formed at ridge portions of the engaging surfaces of the timing belt; a plurality of chambers formed behind root portions of the engaging surfaces of the respective first and second gear means; communication holes formed between the respective root portions and the respective chambers; a plurality of contacts inserted into said respective communication holes to contact said respective rubber portions of the timing belt; and metal springs accommodated in said respective chambers in contact with terminals extending into said respective chambers inside the metal springs in radial directions to contact the same.

* * * * *